(12) United States Patent
Kim

(10) Patent No.: US 8,263,267 B2
(45) Date of Patent: Sep. 11, 2012

(54) RECHARGEABLE BATTERY AND ASSOCIATED METHODS

(75) Inventor: Jinhee Kim, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 515 days.

(21) Appl. No.: 12/458,219

(22) Filed: Jul. 6, 2009

(65) Prior Publication Data

US 2010/0015521 A1  Jan. 21, 2010

(30) Foreign Application Priority Data

Jul. 7, 2008 (KR) .................. 10-2008-0065442

(51) Int. Cl.
*H01M 6/18* (2006.01)

(52) U.S. Cl. ........ 429/307; 429/330; 429/331; 429/332; 429/333; 429/338; 429/339; 429/199; 429/200; 429/231.1; 429/231.3; 429/163; 29/623.1; 29/623.2

(58) Field of Classification Search .................. 429/307, 429/330, 331, 332, 333, 338, 339, 199, 200, 429/231.1, 231.3, 163; 29/623.1, 623.2
See application file for complete search history.

(56) References Cited

U.S. PATENT DOCUMENTS

| | | | |
|---|---|---|---|
| 5,418,682 | A | 5/1995 | Warren, Jr. et al. |
| 7,691,537 | B2 | 4/2010 | Kim |
| 2004/0151981 | A1 | 8/2004 | Spahr et al. |
| 2004/0201366 | A1 | 10/2004 | Kimoto et al. |
| 2006/0194118 | A1 | 8/2006 | Yew et al. |
| 2007/0009806 | A1 | 1/2007 | Kim |
| 2008/0102369 | A1 | 5/2008 | Sakata et al. |
| 2008/0118846 | A1 | 5/2008 | Lee et al. |
| 2008/0248397 | A1 | 10/2008 | Jung et al. |
| 2009/0142663 | A1 | 6/2009 | Takeuchi et al. |
| 2009/0253045 | A1 * | 10/2009 | Kotato et al. ............ 429/199 |
| 2010/0167131 | A1 | 7/2010 | Kim et al. |
| 2010/0233549 | A1 | 9/2010 | Kim et al. |

FOREIGN PATENT DOCUMENTS

| | | |
|---|---|---|
| CN | 1847155 A | 10/2006 |
| EP | 1 742 281 A1 | 1/2007 |
| JP | 2005-505904 A | 2/2005 |
| JP | 2005-066407 A | 3/2005 |
| JP | 2006-245001 A | 9/2006 |
| JP | 2008-108586 A | 5/2008 |
| JP | 2008-235008 A | 10/2008 |
| JP | 2009-158464 A | 7/2009 |
| JP | 2009-527088 A | 7/2009 |
| KR | 10 2000-0074691 A | 12/2000 |
| KR | 10 2006-0114919 A | 11/2006 |
| KR | 10-2007-0006253 A | 1/2007 |
| KR | 10 2007-0091938 A | 9/2007 |
| KR | 10-0814827 B1 | 3/2008 |
| KR | 10-2008-0031151 A | 4/2008 |
| WO | WO 03-032415 A2 | 4/2003 |
| WO | WO 2007/094625 A1 | 8/2007 |
| WO | WO 2007/142121 A1 | 12/2007 |

OTHER PUBLICATIONS

Korean Office Action in KR 10-2008-0065442, dated Oct. 25, 2010 (Kim).
Korean Office Action in KR 10-2008-0065442, dated Jun. 25, 2010 (Kim).
Korean Office Action in KR 10-2008-0065442, dated Jun. 27, 2011 (Kim).
First Office Action in CN 200910140202.5, dated Apr. 21, 2011 (Kim), with English Translation.
Office Action issued in corresponding Japanese application, 2008-292467, dated Nov. 29, 2011.

* cited by examiner

*Primary Examiner* — Laura Weiner
(74) *Attorney, Agent, or Firm* — Lee & Morse, P.C.

(57) ABSTRACT

A rechargeable battery and associated methods, the rechargeable battery including an anode, a cathode, wherein the cathode includes a ternary cathode-active material, a separator interposed between the cathode and the anode, an electrolyte, and a housing enclosing the electrolyte, the anode, and the cathode, wherein the electrolyte includes a lithium salt, a non-aqueous organic solvent, about 0.5 weight % to about 5 weight % of succinonitrile, and at least one of about 1 weight % to about 10 weight % of halogenated ethylene carbonate and about 1 weight % to about 5 weight % of vinyl ethylene carbonate.

12 Claims, 2 Drawing Sheets

FIG. 1A

Table 1A: Materials, Concentrations, Lifespan, and High Temperature Storage Stability.

| Example No. | Cathode-active material | Lithium salt (LiPF$_6$) conc. | VEC weight parts | FEC weight parts | SN weight parts | Lifespan(%) at 300th cycle vs. initial value | Voltage after storage at 60°C for one month |
|---|---|---|---|---|---|---|---|
| Ex. 1  | NCM | 1.15M | 1   | 1  | 0.5 | OK 93 | OK 4.11 |
| Ex. 2  | NCM | 1.15M | 2   | 2  | 0.5 | OK 92 | OK 4.12 |
| Ex. 3  | NCM | 1.15M | 5   | 5  | 1   | OK 88 | OK 4.10 |
| Ex. 4  | NCM | 1.15M | 5   | 5  | 2   | OK 86 | OK 4.09 |
| Ex. 5  | NCM | 1.15M | 5   | 10 | 5   | OK 85 | OK 4.08 |
| Ex. 6  | NCM | 1.3M  | 1   | 1  | 0.5 | OK 91 | OK 4.12 |
| Ex. 7  | NCM | 1.3M  | 2   | 2  | 0.5 | OK 90 | OK 4.13 |
| Ex. 8  | NCM | 1.3M  | 5   | 5  | 1   | OK 89 | OK 4.14 |
| Ex. 9  | NCM | 1.3M  | 5   | 5  | 2   | OK 88 | OK 4.16 |
| Ex. 10 | NCM | 1.3M  | 5   | 10 | 5   | OK 86 | OK 4.08 |
| Ex. 11 | NCM | 1.5M  | 1   | 1  | 0.5 | OK 86 | OK 4.07 |
| Ex. 12 | NCM | 1.5M  | 2   | 2  | 0.5 | OK 88 | OK 4.06 |
| Ex. 13 | NCM | 1.5M  | 5   | 5  | 1   | OK 86 | OK 4.05 |
| Ex. 14 | NCM | 1.5M  | 5   | 5  | 2   | OK 87 | OK 4.07 |
| Ex. 15 | NCM | 1.5M  | 5   | 10 | 5   | OK 86 | OK 4.12 |
| Ex. 16 | NCM | 1.5M  | 2   | 0  | 2   | OK 87 | OK 4.11 |
| Ex. 17 | NCM | 1.5M  | 0   | 5  | 2   | OK 87 | OK 4.09 |
| Ex. 18 | NCM | 1.6M  | 2   | 5  | 2   | OK 84 | OK 4.10 |
| Ex. 19 | NCM | 1.8M  | 2   | 5  | 2   | OK 82 | OK 4.12 |

* LCO: LiCoO$_2$; NCM: LiNiMnCoO$_2$; VEC: vinyl ethylene carbonate; FEC: fluoroethylene carbonate; SN: succinonitrile

FIG. 1B

Table 1B: Materials, Concentrations, Lifespan, and High Temperature Storage Stability.

| Example No. | Cathode-active material | Lithium salt (LiPF$_6$) conc. | VEC weight parts | FEC weight parts | SN weight parts | Lifespan(%) at 300th cycle vs. initial value | Voltage after storage at 60°C for one month |
|---|---|---|---|---|---|---|---|
| Comp. Ex. 1 | LCO | 1M | 0 | 0 | 0 | OK 85 | OK 4.13 |
| Comp. Ex. 2 | NCM | 1M | 0 | 0 | 0 | NG 60 | NG 0.38 |
| Comp. Ex. 3 | NCM | 1.1M | 0 | 0 | 0 | NG 65 | NG 1.58 |
| Comp. Ex. 4 | NCM | 1.15M | 0 | 0 | 0 | NG 70 | NG 2.45 |
| Comp. Ex. 5 | NCM | 1.15M | 0.5 | 0.5 | 0 | NG 75 | NG 2.78 |
| Comp. Ex. 6 | NCM | 1.15M | 1 | 1 | 0 | OK 80 | NG 2.12 |
| Comp. Ex. 7 | NCM | 1.15M | 2 | 2 | 0 | OK 82 | NG 2.08 |
| Comp. Ex. 8 | NCM | 1.15M | 3 | 4 | 0.1 | OK 85 | NG 3.47 |
| Comp. Ex. 9 | NCM | 1.15M | 4 | 6 | 0.2 | OK 88 | NG 3.78 |
| Comp. Ex. 10 | NCM | 1.15M | 5 | 10 | 0.4 | OK 87 | NG 3.81 |
| Comp. Ex. 11 | NCM | 1.15M | 3 | 4 | 6 | NG 78 | OK 4.05 |
| Comp. Ex. 12 | NCM | 1.15M | 3 | 4 | 8 | NG 77 | OK 4.08 |
| Comp. Ex. 13 | NCM | 1.2M | 0 | 0 | 0 | NG 61 | NG 0.98 |
| Comp. Ex. 14 | NCM | 1.2M | 0.5 | 0.5 | 0 | NG 79 | NG 1.45 |
| Comp. Ex. 15 | NCM | 1.2M | 1 | 1 | 0 | OK 82 | NG 1.35 |
| Comp. Ex. 16 | NCM | 1.2M | 3 | 4 | 0 | OK 85 | NG 1.25 |
| Comp. Ex. 17 | NCM | 1.2M | 5 | 10 | 0.3 | OK 86 | NG 3.45 |
| Comp. Ex. 18 | NCM | 1.2M | 6 | 11 | 1 | NG 78 | OK 4.13 |
| Comp. Ex. 19 | NCM | 1.2M | 7 | 12 | 1 | NG 77 | OK 4.13 |
| Comp. Ex. 20 | NCM | 1.2M | 0 | 0 | 0.5 | NG 25 | OK 4.12 |
| Comp. Ex. 21 | NCM | 1.2M | 0 | 0 | 2 | NG 22 | OK 4.13 |
| Comp. Ex. 22 | NCM | 1.2M | 0 | 0 | 5 | NG 23 | OK 4.14 |

* LCO: LiCoO$_2$; NCM: LiNiMnCoO$_2$; VEC: vinyl ethylene carbonate; FEC: fluoroethylene carbonate; SN: succinonitrile

RECHARGEABLE BATTERY AND ASSOCIATED METHODS

BACKGROUND

1. Technical Field

Embodiments relate to a rechargeable battery and associated methods.

2. Description of the Related Art

A cathode-active material of a lithium rechargeable battery is one of four major components necessary for fabrication of a rechargeable battery. It is an important factor that accounts for 40% of material costs, and determines the battery capacity. Even though a lithium cobalt oxide (LCO), e.g., $LiCoO_2$, compound has been widely used as a cathode-active material, use of a ternary cathode-active material is gradually increasing due to a rapid rise in the price of cobalt, and an increased demand for high-capacity batteries. In the case of LCO-based cathode-active materials, cobalt is responsible for about 60% of the total production cost. However, the ternary cathode-active material accounts for only about 15 to 17% of the battery production cost, which is thus capable of saving about 20% of the production cost based on the whole battery.

However, such a ternary cathode-active material, e.g., nickel cobalt manganese (NCM), e.g., $Li[NiMnCo]O_2$, or nickel cobalt aluminum (NCA), e.g., $Li[NiAlCo]O_2$, has not been widely used due to various problems including, e.g., dissolution of Ni or Mn ions into an electrolyte, reduction of the dissolved metal ions at the anode surface leading to metal dendrite growth causing metal dendrite penetration of a separator, and consequently occurrence of an internal short circuit thus resulting in a voltage drop. That is, in a cylindrical battery typically used in notebook computers, a charged battery may be exposed to a high temperature of about 40° C to about 60° C. due to heat generation from a main body of the notebook computer. In a battery using the ternary cathode-active material, metal cations dissolved from the cathode-active material, e.g., nickel or manganese ions, may undergo reduction by receiving electrons from a surface of the anode-active material, which may result in undesirable dendritic growth of nickel or manganese metal. Then, the grown dendrite may penetrate into a thin (~10 to 20 μm) polyolefin separator film, which in turn may lead to problems associated with the occurrence of a micro short circuit inside the battery, and a poor voltage accompanied by a voltage drop of the charged battery.

Further, the ternary active material may suffer from a low discharge voltage when compared to LCO-based active materials. Therefore, in order to fabricate a battery for, e.g., notebook computers, etc., the active material should satisfy a driving electric power equivalent to that of LCO, so it may be necessary to compensate for a low voltage relative to LCO by increasing a capacity of the battery using the ternary active material (hereinafter, referred to as "ternary battery"). To this end, it may be desirable to greatly increase initial capacity of a ternary battery relative to a battery using the LCO-based active material (hereinafter, referred to as "LCO-based battery"). It may also be desirable to solve the problems associated with a short battery life and a drop of the voltage upon exposure of the battery to high temperatures for a long period of time.

SUMMARY

Embodiments are therefore directed to a rechargeable battery and associated methods, which substantially overcome one or more of the problems due to the limitations and disadvantages of the related art.

It is therefore a feature of an embodiment to provide a rechargeable battery with excellent lifespan and storage characteristics.

It is therefore another feature of an embodiment to provide a rechargeable battery including a ternary cathode-active material having reduced production costs.

At least one of the above and other features and advantages may be realized by providing a rechargeable battery, including an anode, a cathode, wherein the cathode includes a ternary cathode-active material, a separator interposed between the cathode and the anode, an electrolyte, and a housing enclosing the electrolyte, the anode, and the cathode, wherein the electrolyte includes a lithium salt, a non-aqueous organic solvent, about 0.5 weight % to about 5 weight % of succinonitrile, and at least one of about 1 weight % to about 10 weight % of halogenated ethylene carbonate and about 1 weight % to about 5 weight % of vinyl ethylene carbonate.

The halogenated ethylene carbonate may include fluoroethylene carbonate.

The ternary cathode-active material may include a cathode compound represented by Formula 1:

$$Li_xNi_{1-y-z}Co_yM_zO_\alpha \qquad (1),$$

wherein x, y, z, and α may satisfy the relations: $0.9 \leq x \leq 1.3$, $0 \leq y \leq 0.5$, $0 \leq z \leq 0.7$ $0 \leq \alpha \leq 2$, and $y+z \leq 1$, and M may be Mn or Al.

The ternary cathode-active material may include $LiNi_{0.5}Co_{0.2}Mn_{0.3}O_2$.

The lithium salt may include at least one of $LiPF_6$, $LiBF_4$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlO_4$, $LiAlCl_4$, $LiCl$, and $LiI$.

The concentration of the lithium salt in the electrolyte may be about 1.15 M to about 1.5 M.

The non-aqueous organic solvent may include at least one of a carbonate, an ester, an ether, and a ketone.

The non-aqueous organic solvent may include a carbonate, and the carbonate includes a mixture of a cyclic carbonate with a linear or branched chain carbonate.

The cyclic carbonate may include at least one of ethylene carbonate, propylene carbonate, 1,2-butylene carbonate, 2,3-butylene carbonate, 1,2-pentylene carbonate, and 2,3-pentylene carbonate.

The chain carbonate may include at least one of dimethyl carbonate, diethyl carbonate, dipropyl carbonate, methyl propyl carbonate, ethyl methyl carbonate, and ethyl propyl carbonate.

The non-aqueous organic solvent may include at least three of ethyl carbonate, ethyl methyl carbonate, dimethyl carbonate, diethyl carbonate, and propylene carbonate.

At least one of the above and other features and advantages may also be realized by providing a method of manufacturing a rechargeable battery, including providing an anode, providing a cathode, wherein the cathode includes a ternary cathode-active material, providing a separator interposed between the cathode and the anode, providing an electrolyte, and providing a housing enclosing the electrolyte, the anode, and the cathode, wherein the electrolyte includes a lithium salt, a non-aqueous organic solvent, about 0.5 weight % to about 5 weight % of succinonitrile, and at least one of about 1 weight % to about 10 weight % of halogenated ethylene carbonate and about 1 weight % to about 5 weight % of vinyl ethylene carbonate.

The ternary cathode-active material may include a cathode compound represented by Formula 1:

$$Li_xNi_{1-y-z}Co_yM_zO_\alpha \qquad (1),$$

wherein x, y, z, and α may satisfy the relations: $0.9 \leq x \leq 1.3$, $0 \leq y \leq 0.5$, $0 \leq z \leq 0.7$, $0 \leq \alpha \leq 2$, and $y+z \leq 1$, and M may be Mn or Al.

The concentration of the lithium salt in the electrolyte may be about 1.15 M to about 1.5 M.

BRIEF DESCRIPTION OF THE DRAWINGS

The above and other features and advantages will become more apparent to those of ordinary skill in the art by describing in detail exemplary embodiments thereof with reference to the attached drawings, in which:

FIGS. 1A and 1B illustrate Tables 1A and 1B, showing materials, concentrations, lifespan, and high temperature storage stabilities of rechargeable batteries prepared according to Examples 1 to 19 and Comparative Examples 1 to 22.

DETAILED DESCRIPTION

Korean Patent Application No. 10-2008-0065442, filed on Jul. 7, 2008, in the Korean Intellectual Property Office, and entitled: "Lithium Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an $n^{th}$ member, where n is greater than 3, whereas the expression "at least one selected from the group consisting of A, B, and C" does not.

As used herein, the expression "or" is not an "exclusive or" unless it is used in conjunction with the term "either." For example, the expression "A, B, or C" includes A alone; B alone; C alone; both A and B together; both A and C together; both B and C together; and all three of A, B, and C together, whereas the expression "either A, B, or C" means one of A alone, B alone, and C alone, and does not mean any of both A and B together; both A and C together; both B and C together; and all three of A, B, and C together.

As used herein, the terms "a" and "an" are open terms that may be used in conjunction with singular items or with plural items. For example, the term "a lithium salt" may represent a single compound, e.g., $LiPF_6$, or multiple compounds in combination, e.g., $LiPF_6$, mixed with $LiBF_4$.

As used herein, when referring to the additives, e.g., succinonitrile, the halogenated ethylene carbonate, and the vinyl ethylene carbonate, the term "weight %" will be understood to be weight % based on the weight of the non-aqueous organic solvent, unless specified otherwise. That is, when referring to the halogenated ethylene carbonate and the halogenated ethylene carbonate, the term "weight %" means "weight %, based on 100 weight % of the non-aqueous organic solvent."

Embodiments relate to a rechargeable battery which may have an excellent lifespan and high-temperature storage characteristics, while using a ternary cathode-active material having a relatively low production cost. The rechargeable battery of an embodiment may include a lithium rechargeable battery.

The lithium rechargeable battery may include an anode, a cathode including a cathode material layer including a ternary cathode-active material, a separator interposed between the anode and cathode, and an electrolyte. The electrolyte may include, e.g., a lithium salt, a non-aqueous organic solvent, and additives. The additives may include about 0.5 weight % to about 5 weight % of succinonitrile, and at least one of about 1 weight % to about 10 weight % of halogenated ethylene carbonate and about 1 weight % to about 5 weight % of vinyl ethylene carbonate.

Succinonitrile ($C_2H_4(CN)_2$) may advantageously prevent the electrolyte from decomposing to a gas at the cathode-active material surface through the formation of a film on the cathode-active material surface upon initial charging of the battery. This film may beneficially inhibit continuous dissolution of metal ions, e.g., nickel or manganese, from the cathode-active material. If metal ions, e.g., nickel or manganese ions, are already present as foreign materials in an active material or a metal housing before fabrication of a battery, or the metal ions are dissolved in an electrolyte, succinonitrile may enable those metal ions to remain in the electrolyte by reacting with the metal ions to form metal ion compounds. In this manner, succinonitrile may serve to beneficially prevent the metal ions, which may be dissolved in the electrolyte, from being reduced at an anode-active material surface and forming metal dendrites. These metal dendrites may consequently penetrate a separator, resulting in an undesirable short circuit between the cathode and the anode.

Even though succinonitrile may beneficially inhibit the electrolyte from decomposing at the cathode surface, and may advantageously capture free metal ions, the amount of succinonitrile added is preferably just enough to perform these desirable functions. Maintaining the amount of succinonitrile at about 0.5 weight % to about 5 weight % may help ensure that an excessively increased thickness of a cathode surface film, which may interfere with smooth migration of lithium ions, does not occur, so as to avoid undesirable deterioration of the battery life. Therefore, there may be a particular range of amounts of succinonitrile which should be added to the electrolyte in order to exhibit ideal functionality in the battery.

Further, when succinonitrile is used alone as an additive, a film formed by succinonitrile may undesirably serve as a barrier that interferes with lithium intercalation into, and de-intercalation from, the cathode during charge/discharge cycles. This may result in deterioration of battery life. In order to compensate for such a disadvantage, additives of halogenated ethylene carbonate and/or vinyl ethylene carbonate may be added to improve the battery life. Maintaining the amount of the carbonate additive at about 1 weight % or greater may help ensure that the lifespan improving effects are achieved. Maintaining the amount of the carbonate additive at about 10 weight % or less (for the halogenated ethylene carbonate), or at about 5 weight % or less (for the vinyl ethylene carbonate), may help ensure that the viscosity of the electrolyte is not disadvantageously increased. In addition, maintaining the content of the carbonate additive(s) at or below these amounts may help ensure that excessive formation of a solid electrolyte interphase (SEI) film, unnecessary for the anode, does not occur. Increased viscosity and formation of a SEI film may result in increased internal resistance of the battery, finally leading to decreased battery life. Therefore, there may be a particular range of the carbonate additive which should be used with succinonitrile.

The ternary cathode-active material is preferably a ternary cathode compound represented by Formula 1:

In Formula 1, x, y, z, and α may satisfy the relations: $0.9 \leq x \leq 1.3$, $0 \leq y \leq 0.5$, $0 \leq z \leq 0.7$, $0 \leq \alpha \leq 2$, and $y+z \leq 1$, and M may be Mn or Al, preferably Mn.

Preferably, the ternary cathode-active material is $LiNi_{0.5}Co_{0.2}Mn_{0.3}O_2$.

The halogenated ethylene carbonate may be represented by Formula 2:

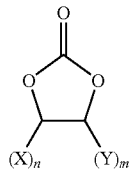

(2)

In Formula 2, X may be F, Cl, Br, or I, Y may be H, F, Cl, Br, or I, and n and m may each independently be 1 or 2. The halogenated ethylene carbonate may be a mono-halogenated, di-halogenated, or tri-halogenated ethylene carbonate. For example, in an implementation, fluoroethylene carbonate, using fluorine as the halogen atom (X=F, n=1, y=H, m=2), may be used.

The amount of succinonitrile in the electrolyte may be about 0.5 to about 5 weight %. When used, the amount of halogenated ethylene carbonate may be about 1 to about 10 weight %. When used, the amount of vinyl ethylene carbonate may be about 1 to about 5 weight %.

Further, the electrolyte of an embodiment may include a lithium salt and a non-aqueous organic solvent.

The lithium salt, which may function as a source of lithium ions for the battery, may thereby support a fundamental function of the lithium battery. The non-aqueous organic solvent may function as a medium through which the ions associated in the electrochemical reaction of the battery may move.

The lithium salt may include, e.g., $LiPF_6$, $LiBF_4$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlO_4$, $LiAlCl_4$, LiCl, LiI, etc.

A ternary battery may be designed to increase discharge capacity in order to provide electric power [discharge capacity (Ah)×average discharge voltage (V)=electric power (Wh)], similar to that of an LCO-based battery. An average discharge voltage of the ternary battery may become low relative to the LCO-based battery. Therefore, in order to increase ionic conductivity of the electrolyte, a concentration of the lithium salt in the electrolyte may be about 1.15 M to about 2 M. Preferably, the concentration of the lithium salt in the electrolyte is about 1.15 M to about 1.5 M. Maintaining the concentration of the lithium salt at about 1.15 M to about 2 M may help ensure that the viscosity of the electrolyte does not increase and the ionic conductivity is maintained.

The non-aqueous organic solvent may include, e.g., a carbonate, an ester, an ether, a ketone, etc. The carbonate of the non-aqueous organic solvent is a different carbonate than the carbonate additives included in the electrolyte. In order to achieve smooth ionic conduction by increasing an ionic dissociation degree, the organic solvent may be one having a high dielectric constant (polar) and a low viscosity. The organic solvent may be employed as a mixture of, e.g., one with high dielectric constant and high viscosity, and another with low dielectric constant and low viscosity.

When a carbonate-based solvent is employed as the non-aqueous organic solvent, it may include a mixture of, e.g., a cyclic carbonate with a linear and/or branched chain carbonate. The cyclic carbonate and linear and/or branched chain carbonate may be mixed in a volume ratio of, e.g., about 1:1 to about 1:9. Preferably, the volume ratio is about 1:1.5 to about 1:4 of cyclic carbonate:linear and/or branched chain carbonate. Maintaining the ratio at about 1:1 to about 1:9 may help ensure that the electrolyte exhibits superior properties.

The cyclic carbonate may include, e.g., ethylene carbonate (EC), propylene carbonate (PC), 1,2-butylene carbonate, 2,3-butylene carbonate, 1,2-pentylene carbonate, 2,3-pentylene carbonate, etc. Ethylene carbonate and propylene carbonate both may have high dielectric constant. When artificial graphite is used as an anode-active material, ethylene carbonate may be used.

The linear and/or branched chain carbonate may include, e.g., dimethyl carbonate (DMC), diethyl carbonate (DEC), dipropyl carbonate (DPC), methyl propyl carbonate (MPC), ethyl methyl carbonate (EMC), ethyl propyl carbonate (EPC), etc. Among them, low viscosity compounds may be more useful, e.g., DMC, EMC, DEC, etc.

The ester may include, e.g., methyl acetate, ethyl acetate, propyl acetate, methyl propionate, ethyl propionate, γ-butyrolactone, γ-valerolactone, γ-caprolactone, δ-valerolactone, ε-caprolactone, etc. The ether may include, e.g., tetrahydrofuran, 2-methyltetrahydrofuran, dibutylether, etc. The ketone may include, e.g., polymethylvinyl ketone, etc.

In an implementation, the carbonate solvent may be combined with an aromatic hydrocarbon organic solvent in the electrolyte. The aromatic hydrocarbon organic solvent may include a compound represented by Formula 3:

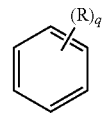

(3)

In Formula 3, R may be a halogen or a straight- or branched-chain alkyl group having 1 to about 10 carbons. In Formula 3, q, i.e., the number of R groups attached to the aromatic ring, may be 0 to 6.

The aromatic hydrocarbon organic solvent may include, e.g., benzene, fluorobenzene, bromobenzene, chlorobenzene, toluene, o-xylene, m-xylene, p-xylene, mesitylene, etc. In the electrolyte including the aromatic hydrocarbon organic solvent, maintaining the volume of carbonate solvent to aromatic hydrocarbon organic solvent at about 1:1 to about 30:1 may help ensure that the battery exhibits superior performance.

The non-aqueous organic solvent preferably includes at least three of ethyl carbonate, ethyl methyl carbonate, dimethyl carbonate, diethyl carbonate, and propylene carbonate.

An embodiment relates to a lithium rechargeable battery. The lithium rechargeable battery may include a cathode and an anode.

The anode or cathode may each be formed by mixing an electrode-active material, a binder, a conductive agent, and a thickener, if necessary, in a solvent to produce a battery slurry composition. The slurry composition may be coated on an electrode collector. Aluminum or aluminum alloy may be used as an anode collector. Copper or copper alloy may be used as a cathode collector. The anode collector and the cathode collector may each independently be, e.g., foil, mesh-shaped, etc.

The cathode may include the ternary cathode-active material represented by Formula 1, capable of lithium ion intercalation/de-intercalation.

The anode may include an anode-active material capable of lithium intercalation/de-intercalation. In an implementation, the anode may include, e.g., lithium metals, alloys of lithium and another element, etc. Elements that form an alloy with lithium may include, e.g., Al, Zn, Bi, Cd, Sb, Si, Pb, Sn, Ga, In, etc. In an implementation, the anode-active material may include, e.g., carbonaceous materials, e.g., crystalline carbon, amorphous carbon, carbon complex, carbon fibers, etc. The amorphous carbon may include, e.g., hard carbon, coke, mesocarbon microbeads (MCMBs) plasticized under 1500° C., mesophase pitch-based carbon fibers (MPCFs), etc. The crystalline carbon may include a graphite-based material, e.g., natural graphite, graphitic coke, graphitic MCMBs, and graphitic MPCFs, etc. In the above carbonaceous materials, a d002 interplanar distance may be about 3.35 Å to about 3.38 Å, and Lc (crystallite size) by X-ray diffraction may be greater than about 20 nm.

The binder may, e.g., make the electrode-active material into paste, may bind active materials with each other, may bind the active materials with the collectors, and/or may buffer the expansion and contraction of the electrode-active material. The binder may include, e.g., polyvinylidene fluoride (PVDF), polyhexafluoropropylene-polyvinylidene fluoride copolymer, poly(vinylacetate), polyvinyl alcohol, polyethylene oxide, polyvinylpyrrolidone, alkylated polyethylene oxide, polyvinyl ether, poly(methylmethacrylate), poly(ethylacrylate), polytetrafluoroethylene, polyvinylchloride, polyacrylonitrile, polyvinylpyridine, styrene-butadiene rubber (SBR), acrylonitrile-butadiene rubber, etc. The content of the binder may be about 0.1 weight % to about 30 weight %, based on 100 weight % of the electrode-active material. Preferably, the binder content is about 1 weight % to about 10 weight %. Maintaining the content of the binder at about 0.1 weight % to about 30 weight % may help impart sufficient adhesive strength between the electrode-active material and the collectors. Maintaining the amount of binder at about 0.1 weight % to about 30 weight % may also help ensure that it is not necessary to decrease the total amount of the electrode-active material in order to accommodate the increased amount of binder, which may undesirably reduce the battery capacity.

The conductive agent may include a material that improves electrical conductivity, and may include, e.g., a graphitic agent, a carbon black agent, a metal, a metallic compound agent, etc. The graphitic agent may include, e.g., artificial graphite, natural graphite, etc. The carbon black agent may include, e.g., acetylene black, ketjen black, denka black, thermal black, channel black, etc. The metallic or metallic compound agent may include, e.g., one or more perovskite materials, e.g., Sn, $SnO_2$, $SnPO_4$, $TiO_2$, $K—TiO_3$, $LaSrCoO_3$, $LaSrMnO_3$, etc. The content of the conductive agent may be about 0.1 weight % to about 10 weight %, based on 100 weight % of the electrode-active material. Maintaining the content of the conductive agent at about 0.1 weight % or greater may help ensure superior electrochemical characteristics. Maintaining the content of the conductive agent at about 10 weight % or less may help ensure an optimal energy density per weight.

There is no particular limit to a thickener, as long as it is able to adjust the viscosity of the active material slurry. The thickener may include, e.g., carboxymethyl cellulose, hydroxymethyl cellulose, hydroxyethyl cellulose, hydroxypropyl cellulose, etc.

The electrode-active material, the binder, and the conductive material may be dispersed in, e.g., a non-aqueous solvent or an aqueous solvent. The non-aqueous solvent may include, e.g., N-methyl-2-pyrrolidone (NMP), dimethylformamide, dimethylacetamide, N,N-dimethylaminopropylamine, ethylene oxide, tetrahydrofuran, etc.

The lithium rechargeable battery may include a separator that serves to prevent a short circuit between the cathode and the anode while allowing for the passage of lithium ions therethrough. The separator may be made from, e.g., a polyolefin polymer film, e.g., polypropylene, polyethylene, polyethylene/polypropylene, polyethylene/polypropylene/polyethylene, polypropylene/polyethylene/polypropylene or other multilayer films, microporous films, woven fabrics, non-woven fabrics, etc. A porous polyolefin film coated with a stable resin may be employed as the separator.

The lithium rechargeable battery may be fabricated by winding or folding an electrode assembly including a cathode containing the ternary cathode-active material of an embodiment, an anode, and a separator interposed between the anode and the cathode, and placing the electrode assembly in a, e.g., cylindrical, polygonal battery case, etc. This may be followed by injection of an electrolyte containing an additive of an embodiment to complete a lithium ion battery.

EXAMPLES

The following Examples and Comparative Examples are provided in order to set forth particular details of one or more embodiments. However, it will be understood that the embodiments are not limited to the particular details described.

Examples 1 to 19 and Comparative Examples 1 to 22

$LiNi_{0.5}Co_{0.2}Mn_{0.3}O_2$ as a cathode-active material, PVDF as a binder, and carbon as a conductive agent were mixed in a weight ratio of 92:4:4, and then dispersed in NMP to produce a cathode slurry. Then, the cathode slurry was coated on aluminum foil having a thickness of 20 μm, dried, and rolled, to produce a cathode.

Artificial graphite as an anode-active material, SBR as a binder, and carboxymethyl cellulose as a stabilizer were mixed in a weight ratio of 96:2:2 and then dispersed in water to produce an anode-active material slurry. The resulting anode-active material slurry was coated on copper foil having a thickness of 15 μm, dried, and rolled, to produce an anode.

An electrolyte was made by dissolving $LiPF_6$ in a non-aqueous organic solvent, which was a mixture of ethylene carbonate/ethyl methyl carbonate/dimethyl carbonate (1:1:1, v/v), to make a 1 M stock solution, as described above, and then additives were added as set forth in Tables 1A and 1B of FIGS. 1A and 1B.

A film separator made of polyethylene (PE) having a thickness of 20 μm was disposed between the electrodes. The electrodes and separator were then wound, compressed, and inserted into a cylindrical housing. Then the electrolyte was inserted into the housing, thereby producing an 18650 cylindrical lithium rechargeable battery.

Example 1

As described above, in the case of a battery using a ternary cathode-active material, metal cations from the active material dissolved in the electrolyte may undergo reduction by receiving electrons from a surface of the anode-active material, which may result in undesirable dendritic growth of, e.g., a nickel or manganese metal. Then, the dendrite may penetrate into a separator film, which in turn may lead to the occurrence of a micro short circuit inside the battery, consequently resulting in the problems associated with a voltage drop of the charged battery. In order to investigate whether the battery in accordance with an embodiment has overcome these problems, high-temperature storage characteristics of the battery were tested. Further, in order to examine whether succinonitrile addition improves or deteriorates the life of a battery, lifespan characteristics at room temperature were studied according to the following experimental procedure.

Room-Temperature Lifespan Characteristics

The batteries fabricated according to Examples 1 to 19 and Comparative Examples 1 to 22 were charged under a condition of 1C/4.2V of constant current and constant voltage, and then discharged a condition of 1C/3V of constant current and constant voltage at 25° C. This cycle was repeated 300 times. When the battery retained a capacity of 80% or more relative to the capacity at the first cycle, it was given "OK". When the battery retained a capacity of less than 80% relative to the capacity at the first cycle, it was given "NG". The results obtained are shown in Tables 1A and 1B.

High-Temperature Storage Characteristics

The batteries fabricated according to Examples 1 to 19 and Comparative Examples 1 to 22 were fully charged at 1C/4.2V for 3 hours and then allowed to stand at 60° C. for one month. When, at the end of one month, the residual voltage of the battery was 4.0 V or higher, it was given "OK". When the residual voltage of the batter was below 4.0 V, it was given "NG".

The battery prepared according to Comparative Example 1, wherein a cathode-active material was LCO, exhibited no lifespan problems nor problems associated with a voltage drop, but showed a disadvantage of relatively high production costs.

The batteries prepared according to Comparative Examples 2 to 4, wherein the concentrations of a lithium salt in the electrolyte were gradually increased with no addition of other additives, exhibited a longer life in response to a higher content of the lithium salt, but showed an undesirable voltage drop after being stored at a high temperature of 60° C. for one month.

The battery prepared according to Comparative Example 5, wherein vinyl ethylene carbonate and fluoroethylene carbonate were co-added to the electrolyte without succinonitrile, was found to be poor in both of lifespan and high-temperature storage characteristics. Particularly, when the carbonate additives were added in a specified content range of an embodiment but succinonitrile was not used therewith (Comparative Examples 6 and 7), or when the carbonate additives were added at a content lower or higher than a specified range of an embodiment even though succinonitrile was added (Comparative Examples 8 to 12), lifespan was improved but high-temperature storage characteristics were poorer than expected.

The batteries prepared according to Comparative Examples 15 to 19, wherein a lithium salt was added at a high concentration of 1.2M, exhibited patterns similar to the batteries with addition of a lithium salt of 1.15 M.

The batteries prepared according to Comparative Examples 20 to 22, wherein succinonitrile was added alone in a specified content range of an embodiment, exhibited improved high-temperature storage characteristics, but showed significant deterioration in lifespan.

Meanwhile, an adequate content of succinonitrile used concurrently with the carbonate additive, e.g., halogenated ethylene carbonate and/or vinyl ethylene carbonate, may show excellent performance in both lifespan and high-temperature storage characteristics, and therefore the batteries according to an embodiment may be commercially viable, even though they were fabricated using a ternary cathode-active material having a relatively low production cost. Particularly when a content of the lithium salt was adjusted to about 1.15 M to about 1.5 M, more preferable effects were obtained.

The rechargeable battery of an embodiment may include an anode, a cathode, wherein the cathode include a ternary cathode-active material, a separator interposed between the cathode and the anode, an electrolyte, and a housing enclosing the electrolyte, the anode, and the cathode. The electrolyte may include a lithium salt, a non-aqueous organic solvent, about 0.5 weight % to about 5 weight % of succinonitrile and an additive including at least one of about 1 to about 10 weight % of a first carbonate including a halogenated ethylene carbonate and about 1 to about 5 weight % of a second carbonate including a vinyl ethylene carbonate, different from the first carbonate. The non-aqueous organic carbonate may include a third carbonate, different from both the first carbonate and the second carbonate.

As is apparent from the above description, the rechargeable batteries in accordance with an embodiment may exhibit excellent lifespan and storage characteristics, even with use of a ternary cathode-active material having a relatively low production cost. Therefore, rechargeable batteries of an embodiment may be used without problems in cylindrical batteries for, e.g., notebook computers, and may thus be excellent in terms of price competition.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:
1. A rechargeable battery, comprising:
an anode;
a cathode, wherein the cathode includes a ternary cathode-active material;
a separator interposed between the cathode and the anode;
an electrolyte; and
a housing enclosing the electrolyte, the anode, and the cathode, wherein the electrolyte includes:
a lithium salt such that a concentration of the lithium salt in the electrolyte is about 1.15 M to about 1.5 M,
a non-aqueous organic solvent,
about 0.5 weight % to about 5 weight % of succinonitrile,
about 1 weight % to about 10 weight % of halogenated ethylene carbonate, and about 1 weight % to about 5 weight % of vinyl ethylene carbonate.

2. The rechargeable battery as claimed in claim 1, wherein the halogenated ethylene carbonate includes fluoroethylene carbonate.

3. The rechargeable battery as claimed in claim 1, wherein the ternary cathode-active material includes a cathode compound represented by Formula 1:

$$Li_xNi_{1-y-z}Co_yM_zO_\alpha \qquad (1),$$

wherein x, y, z, and α satisfy the relations: $0.9 \leq x \leq 1.3$, $0 \leq y \leq 0.5$, $0 \leq z \leq 0.7$, $0 \leq \alpha \leq 2$, and $y+z \leq 1$, and M is Mn or Al.

4. The rechargeable battery as claimed in claim 3, wherein the ternary cathode-active material includes $LiNi_{0.5}Co_{0.2}Mn_{0.3}O_2$.

5. The rechargeable battery as claimed in claim 1, wherein the lithium salt includes at least one of $LiPF_6$, $LiBF_4$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlO_4$, $LiAlCl_4$, $LiCl$, and $LiI$.

6. The rechargeable battery as claimed in claim 1, wherein the non-aqueous organic solvent includes at least one of a carbonate, an ester, an ether, and a ketone.

7. The rechargeable battery as claimed in claim 6, wherein the non-aqueous organic solvent includes a carbonate, and the carbonate includes a mixture of a cyclic carbonate with a linear or branched chain carbonate.

8. The rechargeable battery as claimed in claim 7, wherein the cyclic carbonate includes at least one of ethylene carbonate, propylene carbonate, 1,2-butylene carbonate, 2,3-butylene carbonate, 1,2-pentylene carbonate, and 2,3-pentylene carbonate.

9. The rechargeable battery as claimed in claim 7, wherein the chain carbonate includes at least one of dimethyl carbonate, diethyl carbonate, dipropyl carbonate, methyl propyl carbonate, ethyl methyl carbonate, and ethyl propyl carbonate.

10. The rechargeable battery as claimed in claim 1, wherein the non-aqueous organic solvent includes at least three of ethylene carbonate, ethyl methyl carbonate, dimethyl carbonate, diethyl carbonate, and propylene carbonate.

11. A method of manufacturing a rechargeable battery, comprising:
providing an anode;
providing a cathode, wherein the cathode includes a ternary cathode-active material;
providing a separator interposed between the cathode and the anode;
providing an electrolyte; and
providing a housing enclosing the electrolyte, the anode, and the cathode, wherein the electrolyte includes:
a lithium salt such that a concentration of the lithium salt in the electrolyte is about 1.15 M to about 1.5 M,
a non-aqueous organic solvent,
about 0.5 weight % to about 5 weight % of succinonitrile,
about 1 weight % to about 10 weight % of halogenated ethylene carbonate, and
about 1 weight % to about 5 weight % of vinyl ethylene carbonate.

12. The method of manufacturing a rechargeable battery as claimed in claim 11, wherein the ternary cathode-active material includes a cathode compound represented by Formula 1:

$$Li_xNi_{1-y-z}Co_yM_zO_\alpha \qquad (1),$$

wherein x, y, z, and α satisfy the relations: $0.9 \leq x \leq 1.3$, $0 \leq y \leq 0.5$, $0 \leq z \leq 0.7$, $0 \leq \alpha \leq 2$, and $y+z \leq 1$, and M is Mn or Al.

* * * * *